United States Patent [19]

Pekar et al.

[11] Patent Number: 4,745,557

[45] Date of Patent: May 17, 1988

[54] MACHINE TOOL CONTROL SYSTEM

[75] Inventors: Gary W. Pekar; Billy R. Sewell, both of Grand Prairie; Michael Blanc, Forth Worth, all of Tex.

[73] Assignee: LTV Aerospace & Defense Company, Dallas, Tex.

[21] Appl. No.: 828,919

[22] Filed: Feb. 13, 1986

[51] Int. Cl.[4] .............................................. G06F 15/46
[52] U.S. Cl. ..................................... 364/474; 318/640; 318/332; 408/8; 408/9; 408/10; 408/12
[58] Field of Search ................ 364/474; 455/606, 612; 318/640, 332, 432, 433, 689; 408/8, 10, 12, 9

[56] References Cited

U.S. PATENT DOCUMENTS

| | | | |
|---|---|---|---|
| 4,095,095 | 6/1978 | Muraoka et al. | 235/419 |
| 4,198,180 | 4/1980 | Schultz | 408/9 |
| 4,208,718 | 6/1980 | Chung | 408/10 X |
| 4,310,269 | 1/1982 | Neu et al. | 408/10 X |
| 4,425,061 | 1/1984 | Kindl et al. | 408/16 |
| 4,513,381 | 4/1985 | Houser, Jr. et al. | 408/9 X |
| 4,533,823 | 8/1985 | Vittorio | 235/375 |
| 4,540,318 | 9/1985 | Hornung et al. | 408/9 X |
| 4,559,577 | 12/1985 | Shoji et al. | 408/9 X |
| 4,604,705 | 8/1986 | Imanishi | 364/474 |
| 4,637,169 | 1/1987 | Sigg | 408/10 X |

Primary Examiner—Jerry Smith
Assistant Examiner—Steve Hoang
Attorney, Agent, or Firm—S. S. Sadacca; J. M. Cate

[57] ABSTRACT

A machine tool setting device and control system are provided. The machine tool setting device sets the machine tool tip at a predetermined distance above a work piece by detecting when the machine tool tip intercepts an optical beam. The control system allows for the drilling of multi-ply work pieces wherein the multi-plies comprise different thicknesses and hardnesses. The drill bit translational velocity and rotational velocity are continuously controlled for optimization depending upon the type of material and thickness as a hole is drilled through the work piece.

9 Claims, 3 Drawing Sheets

MACHINE TOOL CONTROL SYSTEM

TECHNICAL FIELD

This invention relates to machine tools, and more particularly to a computer controlled machine tool system which controls the translation and rotational velocity of a drill during the operation of drilling through multi-ply work pieces.

BACKGROUND ART

Aircraft components, and particularly structural members, are composed of multi-ply layers including, for example, graphite epoxy composites, titanium, aluminum, steel and combinations thereof. In the process of fastening one component or work piece of the aircraft to another, fasteners are utilized such as, for example, rivets. Rivet fasteners require the drilling of a pilot hole prior to insertion and swaging of the rivet. In prior aircraft components made of a single material, the drilling of pilots holes was relatively simple in that the drill was operated at a continuous feed rate, translational velocity, and continuous speed, rotational velocity, for the particular material. These parameters were optimized for the particular material, and the control system for these parameters could be changed when the material changed. However, the drilling of multi-ply composite material at a constant translational and rotational velocity is inefficient as well as damaging to drill bits.

In a drilling operation of a composite multi-ply work piece, it is desirable to continuously vary the translation and rotational velocities of the drill bit depending upon a material being drilled. For example, if aluminum or graphite epoxy material is being drilled, it is desirable to operate the drill at a fast rate to minimize the time required in the drilling operation. In contrast, however, if titanium or steel were drilled at a fast rate, drill bit wear would be costly. Continuous drilling through a multi-ply work piece including aluminum and titanium, for example, therefore requires separate drilling parameters for optimization. Therefore, it is necessary to instantaneously change the drilling parameters as the drill bit passes through the multi-ply work piece depending upon the configuration of the plys in the work piece. A need therefore exists for a control system for a machine tool to drill at translational and rotational velocities that are optimized to the material which comprises the workpiece.

In drilling through multi-ply work pieces, if there is a desire to change drilling parameters during the drilling operation, it is essential to make such changes so that they correspond with the material changes in the multi-ply work piece. For example, if a first layer of the work piece is titanium extending for a distance of one inch and the second layer is aluminum extending for a distance of one inch, halfway through the multi-ply layer, it will be necessary to increase the translational and rotational velocity of the drill for maximum drilling efficiency. The system must therefore have the capacity to know exactly where the material change takes place in order to effectuate the parameter changes. In order to accomplish this requirement, a need exists for a system for controlling the positioning of the drill bit prior to the drilling operation to ensure that a control system accurately monitors the position of the drill bit during the drilling operation. Since the drill bit may vary in length from operation to operation, it is necessary that the control system compensate for variations in the drill bit length prior to each drilling operation. The requirement that the drill bit tip be disposed a known distance from the work piece is also essential to ensure that the drill is moving at a predetermined translational and rotational velocity prior to contacting and entering the work piece. A knowledge of the distance between the drill bit tip and work piece is therefore critical.

A fastening operation may involve other steps in addition to drilling a pilot hole. For example, it may be necessary to insert sealant in the pilot hole prior to insertion of a rivet. The pilot hole may also require countersinking depending upon a desired application. It is therefore desired for efficient fastening that a machine tool system provide for multiple operation at a single work station including drilling, ream/countersink, insertion of sealant, insertion of rivet and swaging. A need is thus arisen for a machine tool system in which multiple functions are performed at a single work station or increasing the throughput operation of fastening components.

DISCLOSURE OF THE INVENTION

In accordance with one aspect of the present invention, a machine tool setting device and method is provided for positioning the machine tool tip a known distance from a work piece. A detector is provided for sensing the tool tip at a reference plane in the path of the tool. The detector generates a first signal. A signal processor is provided which is coupled to the detector for receiving the first signal. The signal processor generates a second signal which is applied to a motor for driving the machine tool such that the tip is positioned a predetermined distance from the work piece.

In accordance with another aspect of the present invention, an adaptive control system is provided for a drill which is operable for drilling through a multi-ply work piece wherein each ply has a variable thickness and hardness. The system controls the translational and rotational velocity of the drill as the drill passes through the work piece, such that the rotational and translational velocities are selectively adjusted based upon the type of material within each ply of the multi-ply work piece as the drill passes through the work piece.

In accordance with another aspect of the present invention, a method for drilling through a work piece having multiple layers of material, each layer having variable thickness and hardness, is provided. The method includes inputting data to a controller representing thickness and hardness for each of the materials in the work piece. The translational velocity and rotational velocity are adjusted in accordance with the type of material in the multi-ply work piece. The data is input by reading bar codes which represent the data associated with the work piece.

In accordance with still a further aspect of the present invention, a tool head is provided. The tool head includes a drilling element, a reaming element, a sealant applicator and a rivet applicator all disposed adjacent one another for operation at a single work station.

BRIEF DESCRIPTION OF THE DRAWINGS

The present invention can be more completely understood by reference to the following Detailed Description taken in conjunction with the accompanying Drawings in which.

DETAILED DESCRIPTION

Figure 1:
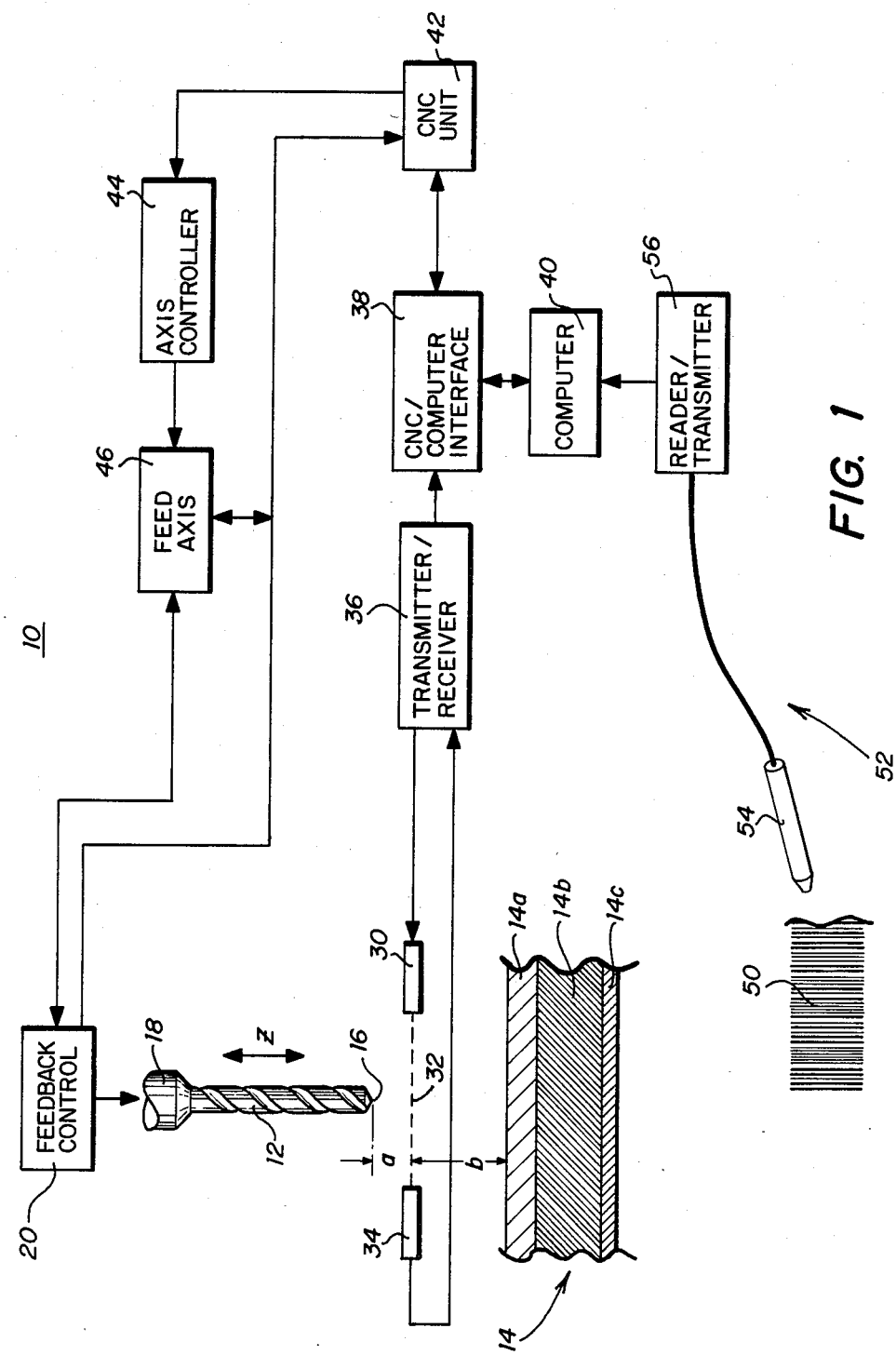
FIG. 1 is a block diagram illustrating several aspects of the machine tool control system of the present invention.

Referring to FIG. 1, the present machine tool control system is illustrated in block diagram and pictoral form, and is generally identified with a numeral 10. A machine tool, such as for example, a drill bit 12 is translatable in the Z axis towards and away from a work piece, generally identified by the numeral 14. Although the machine tool 12 is illustrated as being a drill bit, it is understood that the present invention can be used with other machine tools, for example, laser cutters, water jet cutters, routers and the like. For purposes of discussion, movement of drill bit 12 toward work piece 14 will be referred to as a positive movement whereas movement of drill bit 12 way from work piece 14 will be referred to as a negative movement. Drill bit 12 includes a tip 16 mounted in a spindle 18 in a conventional manner. Translational movement (inches per minute) of drill bit 12 in the positive and negative Z direction is controlled by a conventional feedback control system 20. Additionally, feedback control 20 controls the rotational velocity (revolutions per second), of drill bit 12.

Work piece 14 is comprised of multi-plies 14a, 14b and 14c. While three multi-plies are illustrated, it is understood that multi-plies 14a, 14b and 14c are shown for illustrative purposes only. As few as two multi-plies or greater numbers can be utilized with the present invention. Each multi-ply 14a, 14b and 14c may have a thickness of, for example, about ⅛ inch to about 2 inches. Multi-ply 14a may comprise, for example, aluminum or steel, multi-ply 14b may comprise, for example, graphite epoxy composite material and multi-ply 14c may comprise, for example, titanium. Drill bit 12 operates in a continuous manner for drilling a hole continuously through work piece 14 while optimizing drill life and hole quality utilizing the present invention. Drill bit 12 may operate at translational speeds of one inch per minute and 450 rpm for hard materials such as titanium, and translational speeds of 80 inches per minute and rotational velocities of 8000 rpm for materials such as graphite and aluminum.

The tool setting portion of the present machine tool control system 10 includes an optical beam generator 30 which generates a beam 32. Beam 32 is detected by a detector 34. Optical beam generator 30 and detector 34 interconnect to a transmitter/receiver 36. Transmitter/receiver 36 generates the necessary signals to energize optical beam generator 30 and determine whether beam 32 is established or broken. Transmitter/receiver 36 may comprise, for example, a Model MB3-4 manufactured and sold by Banner Engineering Corporation, Minneapolis, Minn. Optical beam generator 30 may comprise, for example, a Model LR400 and detector 34 may comprise, for example, a Model PT400 also manufactured by Banner Engineering Corporation.

The output of transmitter/receiver 36 representing whether beam 32 is established or broken is applied to a computerized numerical control (CNC)/computer interface 38. CNC/computer interface 38 provides an interface between a computer 40 and a computerized numerical control unit 42. Computerized numerical control unit 42 provides control signals via an axis controller 44 and a feed axis 46 to feedback control 20 for controlling the rotational and translational velocities of drill bit 12. CNC unit 42 receives a feed back signal from feedback control 20 and feed axis 46, such that CNC unit 42, feed axis 46 and feedback control 20 operate in a closed loop manner.

CNC unit 42 may comprise, for example, a DynaPath System 10AM computerized numerical control manufactured by DynaPath Systems Incorporated of Detroit, Mich. Computer 40 may comprise, for example, an Apple IIE Model computer manufactured and sold by Apple, Inc. of Cupertino, Calif.

An additional aspect of the present invention illustrated in FIG. 1 is an input device for machine tool control system 10. Associated with work piece 14 is a label 50 which is imprinted on work piece 14 or adhesively secured to work piece 14. Label 50 employs a bar code marking which comprises a related sequence of substantially parallel bars of predetermined widths and spacings. Label 50 includes encoded information representing the thicknesses of the various plies of work piece 14 in addition to the desired translational velocities and rotational velocities for drill 12 for each ply of work piece 14. The encoded information of label 50 is read by a bar code reader, generally identified by the numeral 52. Bar code reader 52 includes a wand 54 and a reader/transmitter 56. Wand 54 and reader/transmitter 56 may comprise, for example, an Intermec Model 9300 manufactured and sold by Interface Mechanisms, Inc. of Lynnwood, Wash. Data read by bar code reader 52 is applied to computer 40 for control of CNC unit 42 as will subsequently be described with respect to FIG. 3.

Figure 2:
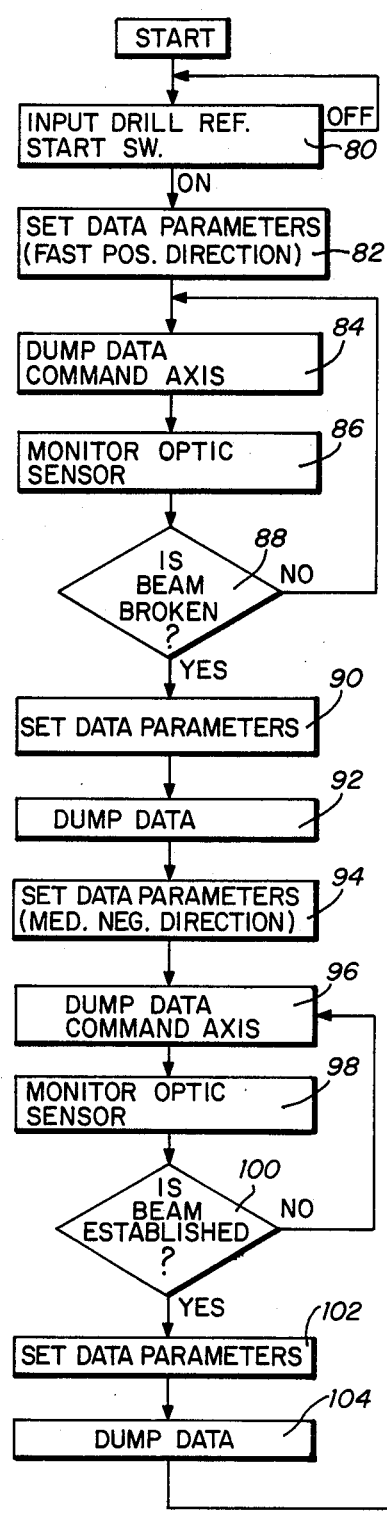
FIG. 2 is a computer flow diagram illustrating operation of the machine tool setting device of the present invention.
Figure 2:
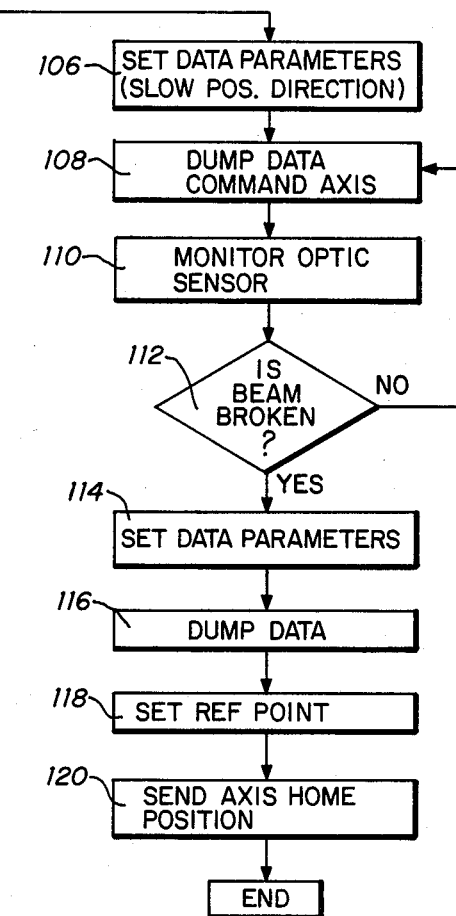

Referring simultaneously to FIGS. 1 and 2, the present machine tool sensing device and the method of machine tool control system 10 will now be described. Prior to a drilling operation, it is desired to know the exact location of tip 16 of drill bit 12 with respect to the work piece. Due to variations in the length of drill bit 12, this position is undetermined prior to a drilling operation. It is further necessary to know the exact location of tip 16 in order to ensure that drill bit 12 is operating at the desired translational velocity and rotational velocity prior to contact with work piece 14.

The present invention therefore determines when a tip 16 breaks beam 32, and through operation of CNC unit 42 feedback control 20 moves drill bit 12 a predetermined known distance in the negative direction. This predetermined known distance is illustrated in FIG. 1 as reference numeral a. In this manner, the distance, a, is always fixed prior to start of a drilling operation. By maintaining the distance from beam 32 to the top surface of work piece 14, illustrated in FIG. 1 as reference numeral b, a fixed quantity, the total distance a plus b is a known quantity prior to drilling. The position of tip 16 shown in FIG. 1 is referred to as the "home" position, and it is this position which is determined by operation of the present invention.

One method of the present invention for determining the home position is to move drill bit 12 in the positive direction at an extremely slow translational velocity under control of CNC unit 42 until tip 16 breaks beam 32. The output of transmitter/receiver 36 is applied to CNC unit 42 via CNC/computer interface 38 to indicate that further translational motion in a positive direction should cease. At this point, due to the programming of CNC unit 42, feedback control 20 moves drill bit 12 in a negative direction to the predetermined distance, a. The home position is therefore achieved. This method however, requires that drill bit 12 be translated at an extremely slow rate to detect the precise moment of contact with beam 32. In a production environment, the time required to establish the home position using this method of the present invention may be too time consuming. Therefore, the present invention further includes an alternative procedure.

Referring to FIG. 2, a computer flow diagram illustrating the alternative method of the present invention for determining the home position of drill bit 12 is described. Operation begins at Start to determine whether a start switch has been actuated by the operator of the present machine tool control system 10. If the start switch has been actuated at block 80, data parameters are set at block 82. These data parameters are predetermined and stored in CNC unit 42 to move drill bit 12 at a fast rate in the positive direction. Data from transmitter/receiver 36 is applied to CNC/computer interface 38 at block 84 to continuously command CNC unit 42 to move drill bit 12 in a positive direction. CNC/computer interface 38 continuously monitors to determine whether beam 32 has been broken at block 86, and if it has not, at decision block 88, the program continues at block 84. If tip 16 does break beam 32, data parameters in CNC unit 42 are set to stop the positive movement of drill bit 12 at block 90. This data is dumped to CNC/computer interface at block 92. Since drill bit 12 is moving at a fast rate CNC unit 42 does not respond quickly enough to stop drill bit 12 precisely so that tip 16 just breaks the plane of beam 32, but drill bit 12 continues towards work piece 14 and tip 16 extends past the plane of beam 32.

The flow diagram continues at block 94 in which data parameters are set to allow CNC unit 42 to move drill bit 12 at a medium translational speed in the negative direction. This rate of speed is slower than the rate drill bit 12 moved in the positive direction. In a manner as previously described, data is dumped to the CNC/computer interface 38 from transmitter/receiver 36 continuously to allow CNC unit 42 to move drill bit 12 in the negative direction at block 96. At block 98, the output of transmitter/receiver 36 is monitored to determine if beam 32 has been reestablished thereby indicating that tip 16 has moved to the opposite side of the plane of beam 32. If the beam is still broken by the presence of drill bit 12 extending through the plane of beam 32, the flow returns to block 96. If beam 32 is reestablished, the data parameters are set to require CNC unit 42 to stop drill bit 12 at block 102 and the data is dumped at block 104 to CNC/computer interface 38.

The final step in determining the home position of tip 16 is to move drill bit 12 at a still slower speed in a positive direction towards beam 32. Data parameters are set to allow axis controller 44 to move drill bit 12 at a slow rate, slower than the previously set rate for moving drill bit 12 in the negative direction at block 106. In the manner as previously described, data is dumped to the CNC/computer interface 38 as drill bit 12 moves in the positive direction at block 108. The condition of the output of transmitter/receiver 36 is monitored at block 110 to determine at decision block 112 whether beam 32 has been broken. If drill bit 12 continuously is translated without breaking beam 32, the flow returns to block 108. If beam 32 is broken, data parameters are set to stop axis controller 44 at block 114 and data is dumped to CNC/computer interface 38 at block 116. At this step of the present method, tip 16 has just broken the plane of beam 32 and the location of tip 16 is now known to CNC unit 42.

This reference point is set at block 118, CNC unit 42 thereafter signals axis controller 44 to move drill bit 12 to the home position at block 120. The home position is therefore set as the start position for the drilling operation of drill bit 12. By actuation of drill bit 12, tip 16 will have traveled the distance a plus b prior to contacting the surface of work piece 14, such that drill bit 12 will have achieved the desired translational velocity and rotational velocity prior to contact. Based upon stored data within the program controlling CNC unit 42, which was previously input via computer 40, drill bit 12 will translate in the positive direction for a distance of the thickness of ply 14a at a predetermined rotational and translational velocity, translate for the distance representing the thickness of ply 14b at a predetermined rotational and translational velocity and translate for a distance representing the thickness of ply 14c at a predetermined rotational and translational velocity. In this manner, the translational velocities, as well as rotational velocities, are controlled on a continuous basis as drill bit 12 passes through work piece 14. Changes in the translational velocity and rotational velocity occur at the boundaries of the various plies of work piece 14 under control of CNC unit 42.

Figure 3:
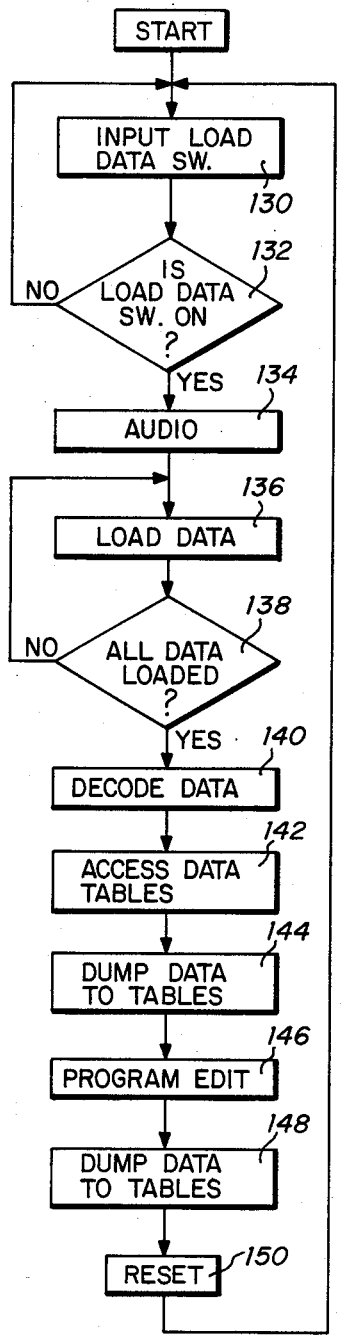
FIG. 3 is a computer flow diagram illustrating operation of the data input aspect of the present invention.

Referring simultaneously to FIGS. 1 and 3, bar code reader 52 reads the information contained on label 50 and provides a serial code output to computer 40. Information contained on label 50 provides necessary CNC unit 42 data parameters and selects data stored in the memory of CNC unit 42. This data is the particular translational velocity and rotational velocity associated with a particular type of material comprising work piece 14. The actual information read from label 50 by bar code reader 52 is the memory locations for the particular velocities which are stored in CNC unit 42 and the actual thicknesses of the materials comprising work piece 14.

Referring to FIG. 3, when the operator desires to input data to computer 40 using bar code reader 52, an input switch is activated at block 130. Computer 40 continuously monitors the load data switch to determine whether it has been actuated. A decision is made at decision block 132 and if the load data switch has been switched on, an audio signal is sounded to the operator at block 134 to indicate that the bar code reader is ready to accept data. At block 136, the serial data from reader/transmitter 56 is loaded into computer 40. Data is loaded into computer 40 as each character of the bar code contained on label 50 is scanned. If all data is not loaded, the computer flow turns to block 136. Scanning is continued until all characters of the bar code have been read and loaded. Once all data has been scanned indicated by a specified character of the bar code and loaded in computer 40, the data is decoded at block 140 in a particular format compatible with CNC unit 42.

The specific data tables are then accessed at block 142 and data is dumped at block 144 within CNC unit 42. The specific data tables are accessed corresponding to the particular thicknesses of the plies of work piece 14. The program continues at block 146. An additional data dump is made to the tables of CNC unit 42 at block 148 and a reset function is accomplished at the CNC unit 42 to place it in a run mode. The computer flow then returns to block 130. In summary, bar code data is stored within computer 40, transferred to storage tables within CNC unit 42 and then this data is used by the programs of CNC unit 42 for controlling the movement of drill bit 12.

Figure 4:
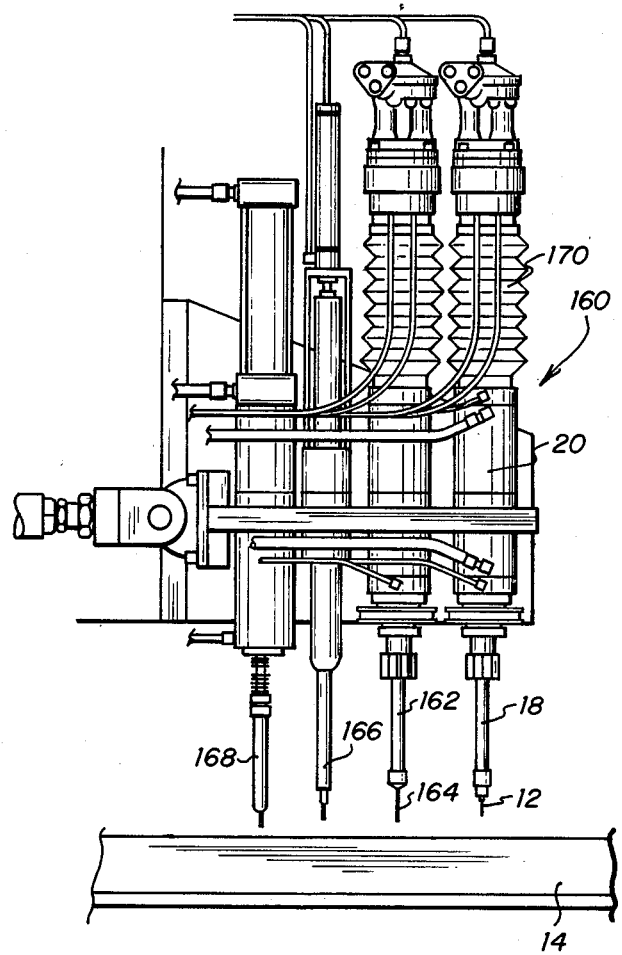
FIG. 4 illustrates a machine tool head of the present invention.

Referring to FIG. 4, a head assembly, generally referred to by the numeral 160 is illustrated. Head 160 includes servo control 20 and spindle 18. Drill bit 12 is mounted within spindle 18. Head 160 also includes a reamer 162 having a bit 164. Further included within head 160 is a sealant applicator 166 and a rivet applicator 168 for inserting a rivet as well as upsetting the rivet. Rivets are supplied to head 160 via tracks 170. Work piece 14 is disposed adjacent head 160, and remains in a fixed position while the elements of head 160 perform their various operations. Head 160 translates so that movement of work piece 14 is not necessary.

Therefore it can be seen that the present invention provides for a machine tool control system for performing operations on a multi-ply work piece in which translational velocities and rotational velocities of a drill bit are continuously monitored depending upon the thickness and type of material being drilled. The present control system further ensures that the drill bit tip is driven from a known position prior to commencement of the drilling operation. A further aspect of the present invention is the use of a bar code for inputting data representing ply thicknesses and machine tool translational and rotational velocities.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. An adaptive control system for a drill for drilling through a multi-ply work piece wherein each ply has a variable thickness and hardness comprising:
   means for storing drilling information including the thickness and hardness for each of the materials in the work piece;
   means for generating control signals based upon said stored drilling information; and
   means for receiving said control signals and for continuously controlling a translational velocity and rotational velocity of the drill as the drill passes through the work piece in response to said control signals, such that the translational velocity and rotational velocity are selectively adjusted based upon the type of material within each ply of the multi-ply work piece as the drill passes through the work piece.

2. A method for drilling through a work piece having multi-ply layers of material having a variable thickness and hardness including the steps of:
   inputting data representing thickness and hardness for each of the materials in the work piece to a controller;
   storing the input data;
   increasing the translational velocity and rotational velocity of the drill for soft materials based upon the stored input data as the drill passes through the work piece; and
   decreasing the translational velocity and rotational velocity of the drill for hard materials based upon the stored input data as the drill passes through the work piece.

3. The method of claim 2 wherein the step of inputting data includes the step of reading bar codes representing the data.

4. A monitor for a drill having a tip for drilling through a multi-ply work piece including:
   means for storing drilling information based upon the type of material within each ply of the multi-ply work piece prior to commencement of drilling;
   means for positioning the drill tip at a predetermined distance above the work piece;
   means for moving the drill at a predetermined translational velocity and rotational velocity toward the work piece based upon said stored drilling information; and
   means for continuously controlling the translational velocity and rotational velocity of the drill as the drill passes through the work piece, such that the translational velocity and rotational velocity of the drill are selected based upon said stored drilling information.

5. The monitor of claim 4 wherein said means for controlling includes a computerized numerical control unit.

6. The monitor of claim 5 and further including:
   input means for inputting data to said computerized numerical control unit representing a translational velocity and a rotational velocity for each ply of the multi-ply work piece.

7. The monitor of claim 6 wherein said input means includes a bar code reader for reading data in the form of a bar code representing characteristics of the work piece.

8. A control system for a drill for drilling through a multi-ply work piece wherein each ply has a variable thickness and hardness comprising:
   a scanning device for reading a binary-coded pattern formed on the work piece, said pattern having high and low reflection portions and containing an item of encoded drilling information for the work piece on which said pattern is formed;
   a control device for storing a plurality of items of drilling information including drill translational velocity and rotational velocity read by said scanning device and for reading out drilling information which represents the item of scanned information to produce control signals representing the item of drilling information read out; and
   means for translating and rotating the drill upon receipt of the control signals during the drilling operation from said control device for performing the drilling operation, such that the translational velocity and rotational velocity of the drill are changed by the control signals based upon the previously stored drilling information representing the type of material within each ply of the multi-ply work piece.

9. The system of claim 8 wherein said binary-coded pattern includes the thickness of the multi-ply work piece and the drill translation and rotational velocities for the work piece.

* * * * *